Figure 2:
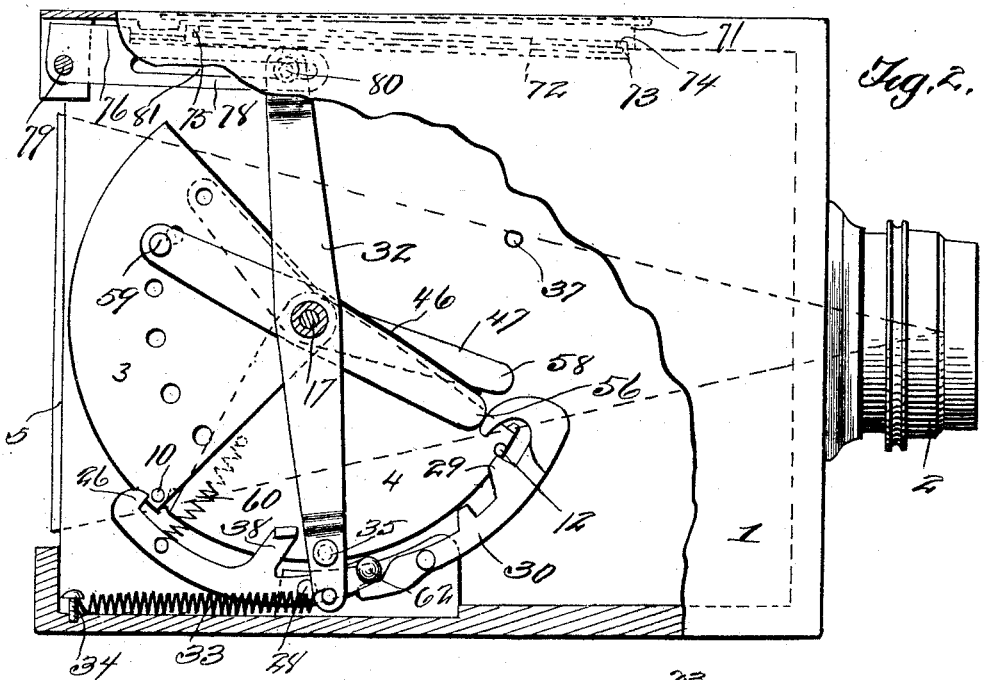

O. W. PLANT.
CAMERA.
APPLICATION FILED OCT. 10, 1908.
974,990.
Patented Nov. 8, 1910.
4 SHEETS—SHEET 1.
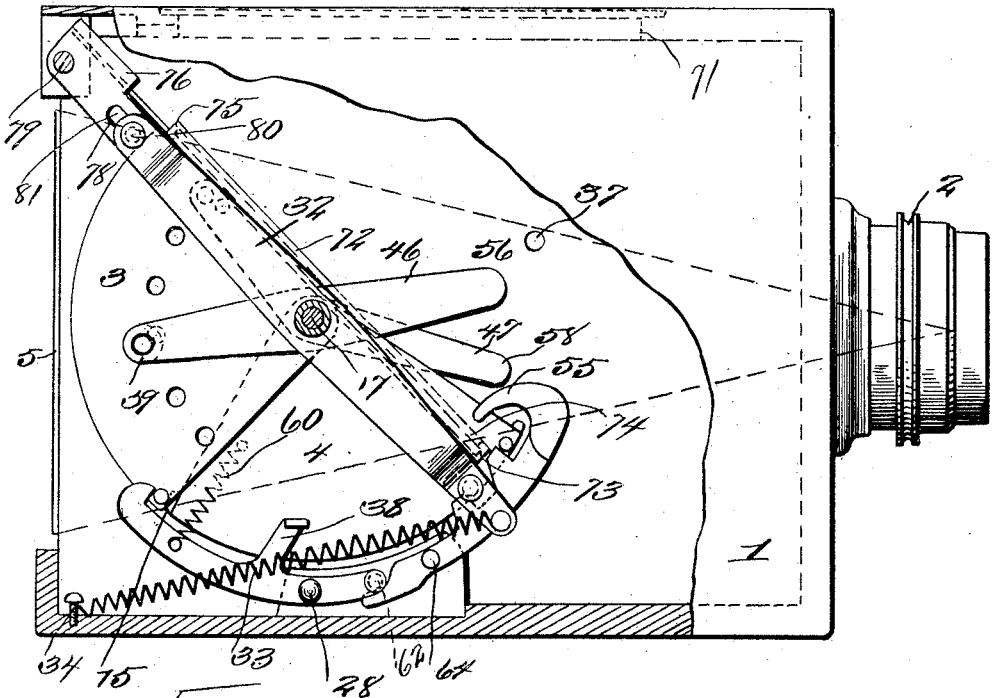
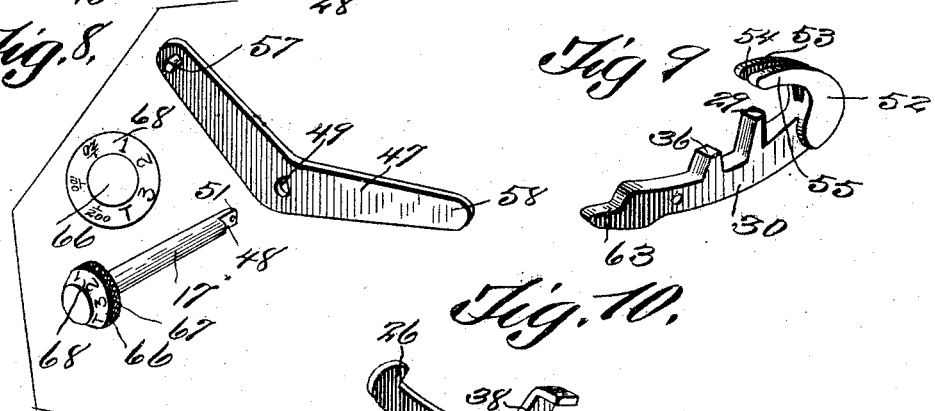
Witnesses
R. A. Boswell,
A. M. Whitmore.
Inventor
Oliver W. Plant,
By E. B. Whitmore,
Attorney

O. W. PLANT.
CAMERA.
APPLICATION FILED OCT. 10, 1903.

974,990.

Patented Nov. 8, 1910

4 SHEETS—SHEET 2.

Witnesses
R. H. Boswell
A. M. Whitmore

Inventor
Oliver W. Plant,
By E. B. Whitmore,
Attorney

O. W. PLANT.
CAMERA.
APPLICATION FILED OCT. 10, 1908.
974,990.
Patented Nov. 8, 1910.
4 SHEETS—SHEET 3.
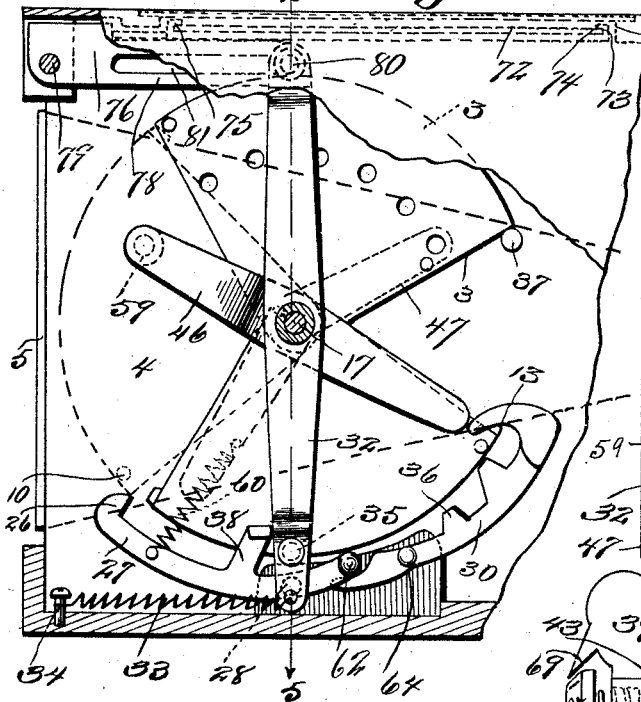
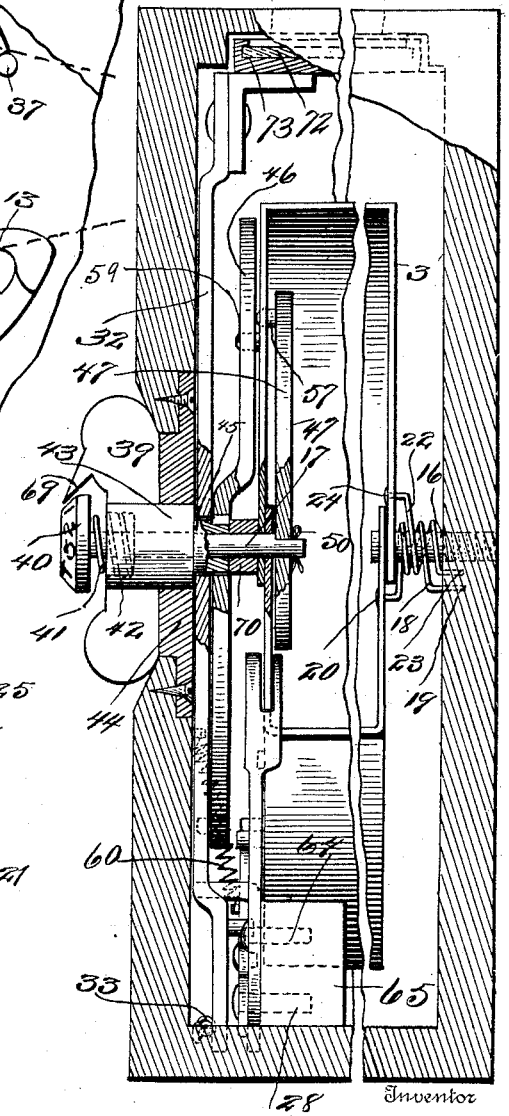
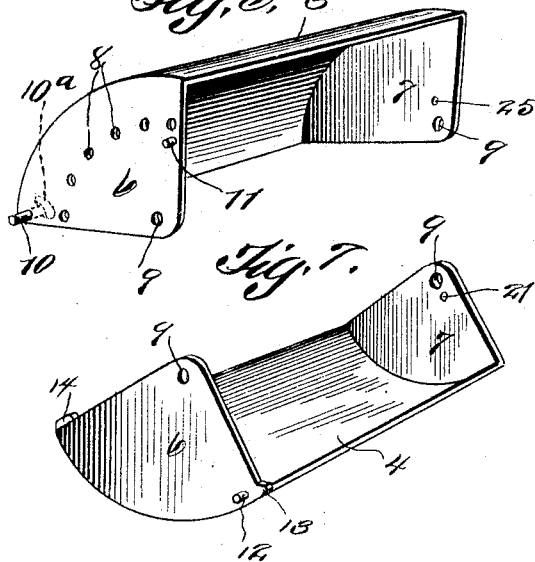
Witnesses
R. A. Boswell.
A. M. Whitmore.
Inventor
Oliver W. Plant,
By E. B. Whitmore,
Attorney
THE NORRIS PETERS CO., WASHINGTON, D. C.

O. W. PLANT.
CAMERA.
APPLICATION FILED OCT. 10, 1908.
974,990.
Patented Nov. 8, 1910.
4 SHEETS—SHEET 4.
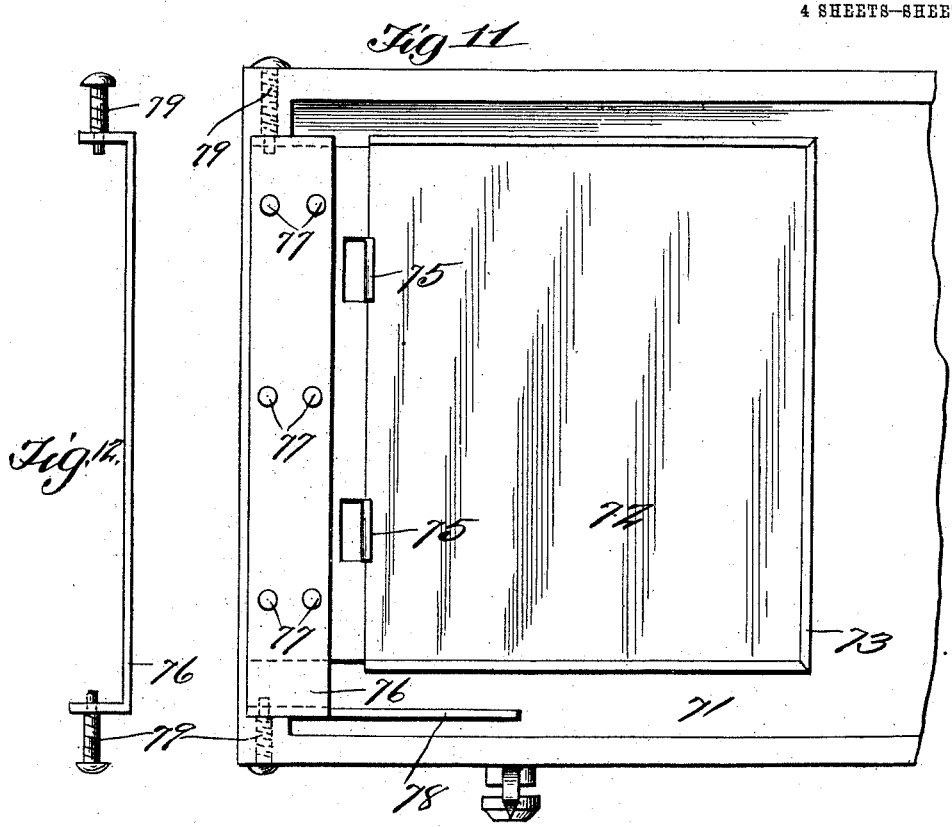
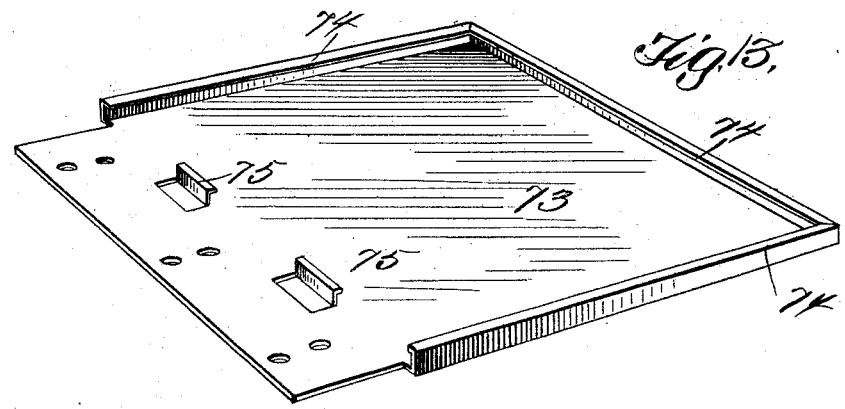

UNITED STATES PATENT OFFICE.

OLIVER W. PLANT, OF PROVIDENCE, RHODE ISLAND.

CAMERA.

974,990.  Specification of Letters Patent.  Patented Nov. 8, 1910.

Application filed October 10, 1908.  Serial No. 457,102.

*To all whom it may concern:*

Be it known that I, OLIVER W. PLANT, of Providence, in the county of Providence and State of Rhode Island, have invented a new and useful Improvement in Cameras, which improvement is fully set forth in the following specification and shown in the accompanying drawings.

This invention relates to certain new and useful improvements in cameras and pertains more particularly to the shutter thereof and the means of operating the same.

The present improvements, while applicable to the different varieties of cameras, is more particularly adapted for outdoor or field work for taking snapshot pictures, provision being made, however, for making exposures of one or more seconds' length, as well as for time exposures.

In addition to the ends usually sought in devices of this general character, the present invention aims at improvements in a multiple sector shutter wherein the one sector moves independently of the other, serving alternately to cut off the light and turning upon the same center, the one being adjustable with relation to the other to vary the time of exposure.

A further object of the invention is to provide simple means for focusing and for viewing the object being photographed before the exposure is made. This embodies a movable mirror normally closing the view-opening in the top of the camera box, but mounted to swing into a position at an angle of substantially 45° so that the image thrown upon it through the lens will be reflected upward through the opening in the camera and visible to the operator. The construction is such, however, that before an exposure is made this inclined mirror is not only moved out of the way of the light passing through the lens but is moved to its normal position, closing the said opening in the top of the camera so as to completely exclude the light. This mirror is actuated by the major swinging or controlling arm of the shutter in its initial movement before releasing the first-moving sector.

In addition to the above, I aim also at improvements in the details of construction whereby a more complete and compact and efficient camera is provided, and in which the parts are readily assembled, not liable to get out of order, and reliable and efficient in operation.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 3:
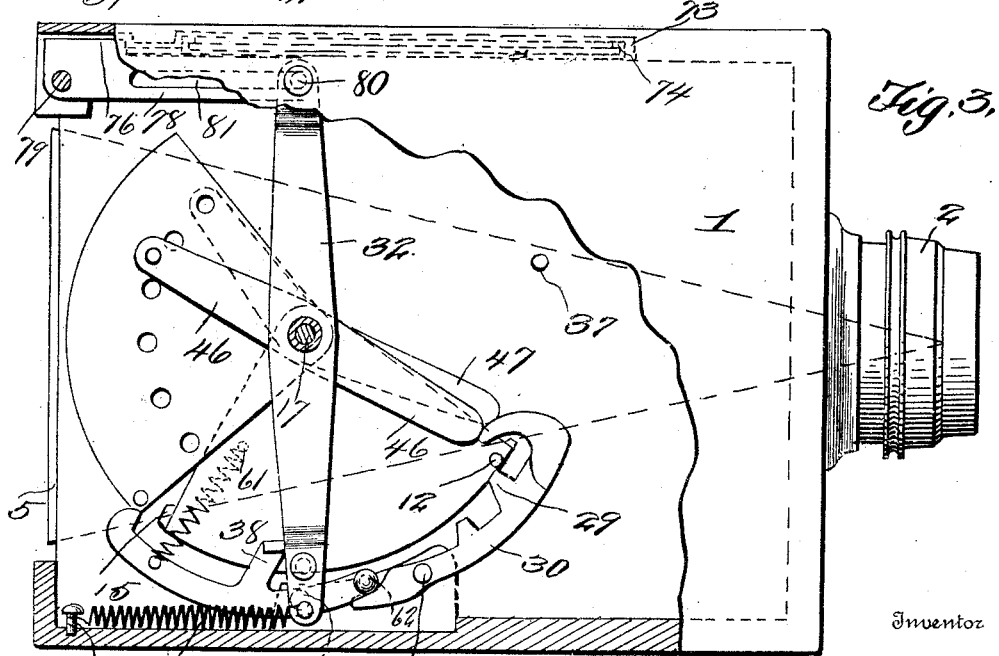

Figure 1 is a side elevation with portions broken away, showing the parts in their normal position, or as they appear before making an exposure. Fig. 2 is a similar view with the parts in the position they assume after the initial movement of the major swinging arm has been made, and the mirror returned to its normal or closed position. Fig. 3 is a similar view with the parts shown in the position they assume just before the first-moving sector is given its initial movement. Fig. 4 is a like view with the lens removed, showing the position of the parts after an exposure has been made. Fig. 5 is an enlarged substantially central vertical section through the camera as on the line 5—5 of Fig. 4. Fig. 6 is a perspective view of the first moving shutter. Fig. 7 is a like view of the second-moving or closing shutter. Fig. 8 shows in perspective the exposure-regulating arm and its actuating shaft, said parts being shown separated. Fig. 9 is a perspective view of one of the pawls. Fig. 10 is a similar view of the other or retaining pawl. Fig. 11 is a detail in plan showing the mirror-holding device. Fig. 12 is an edge view of the backing sheet and the metallic strip with its pivot screws. Fig. 13 is a perspective view of the backing sheet with its turned over edges and fastening clips.

Like numerals of reference indicate like parts throughout the several views.

Referring to the drawings 1 designates the camera body or box having at one end the lens holder 2, these parts being of well-known or approved construction.

It is a well-known fact that as light is refracted or diffused or spread out from its path or absorbed by the medium through which it is projected, it is impossible to expose the whole of a photographic plate at the same instant and that that part which is first exposed is acted upon by the direct rays or light pencils projected by the lens, the remainder of the plate being acted upon first by the reflected light from the first light pencil coming in contact with the photographic plate. This reflected light is proportionate to the power of the first light coming in contact with the plate, therefore every part of the plate not acted upon by the first light pencils is fogged.

It is the primary object of my invention to reduce to a minimum this fogging of the plate and to be enabled to make a picture with a shorter exposure. This is accomplished by the mechanism now to be described.

3 and 4 are the obscuring sectors constituting the shutter, being constructed to serve alternately to cut off the light from the plate 5 coming from the lens in the lens holder 2. These sectors are each formed of thin sheet material, as metal curved like portions of a cylinder and having thin heads 6 and 7 in the form of sectors of a circle, the said parts 3 and 4 being of practically the same size except that the part 4 is a trifle shorter than the part 3 so that its sectoral heads will just pass within those of the other sector, both bodies turning on the same axis, which axis is disposed at the point that may be termed the apex of the sectors. The head 6 of the sector 3 is provided with a plurality of openings 8 arranged upon a curve concentric with the periphery of the sector, as seen clearly in Fig. 6, for a purpose which will soon be described. In the following description, the member 3 will be termed the "opening" sector or shutter and the member 4 the "closing" sector or shutter. The sectors 3 and 4 are provided with openings 9 in their heads for the reception of the axes upon which they are mounted for pivotal movement, as will hereinafter appear. The sector 3 has upon the end or head provided with the openings 8 just described, a headed pin 10 projecting outwardly therefrom, as seen in Fig. 6, and also with a pin 11 which is disposed near the opposite edge of said head, these pins or projections being for a purpose which will soon be described. The sector 4 is provided upon its head with a pin 12 projecting in the direction of the length of the sector, and in proximity thereto but projecting at right angles to the pin 12, in line with the said head, with a projection 13, and upon the opposite edge of said head with a similar projection 14, the object of which projections and pin will be made clear as the description proceeds. As shown in Fig. 1, the sectors are in such position that the sector 3 is so disposed as to obscure the plate 5. In making an exposure, the sector 3 is turned upward to the full line position in Fig. 4, it being immediately followed by the sector 4 which then occupies the position originally occupied by the sector 3 and in turn obscures the plate 5. It will be noticed that there is a slight space 15 between the opposing edges of the sectors 3 and 4, through which space or opening the exposure is made as the opening passes upward as the sectors are moved in front of the plate 5, this being an instantaneous exposure, but provisions are made, as will be hereinafter described, to increase this opening 15 for the purpose of making exposures of different lengths. The sectors are moved upon the pivots or pintles 16 and 17 mounted in the openings 9 in the ends of said sectors in the adjacent walls of the camera. A spring 18 has one end secured in the wall of the camera, as seen at 19, and its other end secured as at 20 to the adjacent end of sector 4, which is provided with an opening 21 therefor, as seen in Fig. 7, while another spring 22 has one end secured, as at 23, to the adjacent wall of the camera and its other end secured, as at 24, in an opening 25 provided in the adjacent end of the other sector, the two springs being coiled in opposite directions around the pivot or pintle 16 without interfering with each other in their actions, as seen clearly in Fig. 5, for a purpose which will soon be explained. The headed pin 10 of the sector 3 is normally engaged by a hook 26 on a pawl 27 pivotally mounted at 28 to the adjacent wall, which pawl serves to temporarily hold the sector 3 in position against the action of its spring. The pin 12 of the sector 4 is engaged by a lug or projection 29 on the member or pawl 30 pivoted at 31, which serves to hold the sector 4 in position temporarily against the action of its spring.

32 is a major swing arm held coaxial with the sectors 3 and 4 and designed to be actuated at proper times by a spring 33 attached at one end to the lower end of said arm and at its other end to the bottom of the camera, as seen at 34 in Fig. 4, said spring tending to hold the lower end of said arm to the left. This arm carries near its lower end a lateral pin 35 in position to be engaged by a lug or tooth 36 on the member 30 to hold the arm slanting at an angle of 45°, as indicated by full lines in Fig. 1.

37 is a pin projecting inwardly from the wall of the camera, as seen in Figs. 1 and 4. This pin serves a function which will be made clear as the description proceeds, being for the purpose of stopping the upward swing of sector 3 after the same has been given its upward movement by its spring after the right hand end of the pawl 30 has been slightly depressed so as to release the major swing arm 32 which is quickly pulled at its lower end to the left by its spring 33, and the pin 35 striking the upwardly extending arm 38 of the member 27 throws the latter downward so as to release the pin 10 when the sector 3 immediately takes the full line position seen in Fig. 4, being brought to a stop by engagement of its forward edge with said pin 37. Sector 4 being quickly released, as will soon appear, follows immediately after the sector 3, and, taking the place formerly occupied by said sector 3, performs the function previously performed thereby, that is, cutting off the light from the lens and obscuring the plate 5.

39 is a handle or button designed to be revolved or turned by the thumb and finger of the operator. This button is hollow and holds within it the pintle or pivot 17 having a head 40, the latter being normally held in a slightly retracted position by means of a small spiral spring 41 seated in a depression or chamber 42 in the hub portion of said button 39, as seen clearly in Fig. 5. The button 39 is formed with an inwardly extending hub member 43 suitably engaged in an opening in a plate 44 secured within the camera and having a flange engaged in a rabbet in the inner wall thereof, as seen in Fig. 5. This hub is formed with a reduced part 45 upon which is secured the major swing arm 32 and a two-armed member 46, seen best in Fig. 4. The major swing arm 32 turns freely on this reduced part but the member 46 is rigid therewith so that both turn together.

An angular member 47 is made rigid with the extreme inner end of the pintle 17 so as to always turn therewith, the end 48 of said pintle 17 being adapted for engagement in the opening 49 of said member 47, the said opening having a flat side, as seen in Fig. 8, corresponding with the flat side of the pintle, and the parts being held against endwise displacement by suitable means as a cotter pin or the like 50 passed through an opening 51 in the end 48 of said pintle.

As seen best in Fig. 9, the pawl or member 30 is enlarged at one end, as shown at 52, and this enlarged end is bifurcated, as seen at 53, the two arms 54 and 55 formed by such bifurcation straddling the adjacent edge of the head of the sector 4, the part 55 being outside said head, while the part 54 is inside of the head, as seen clearly in Fig. 5; the construction and arrangement of parts is such that the end 56 of the arm 46 will touch the part 55 when swung against it by turning the button 39, pushing the part 30 back to the position seen in Fig. 2, releasing the major swing arm 32, but not sufficiently to release the pin 12, the latter being yet engaged by the tooth 29 of the pawl 30, as seen in Fig. 2.

The arm 47 is provided at one end with a laterally projecting stud or pin 57, as seen clearly in Fig. 8, which is adapted to engage in any one of the series of holes 8 in the end 6 of the sector 3. If this pin be engaged in the first hole nearest the pin 11, the opposite end 58 of the member 47 will be close to the arm 54 of the bifurcated end of the pawl 30, as seen in Fig. 1, so that the moment sector 3 starts to swing upward under the influence of its spring when released, the said end 58 will encounter said member 54 and push the member 30 back to the position seen in Fig. 3 which will release the pin 12 from the tooth 29 when the sector 4, being released, will instantly follow the sector 3 and take the place formerly occupied thereby. The end 58 of the member 47 is longer or extends outward from the center of motion of the swing arms 32, 46 and 47 farther than the end 56 of the member 46 so that while the end of the member 46 pushes the pawl 30 far enough back to release the major arm 32, it does not push it far enough back to release the pin 12 of the sector 4. But when the longer arm 58 of the member 47 is brought into contact with the member 54 of the pawl 30, it pushes the latter far enough back to disengage its tooth 29 from the pin 12 and allow the sector 4 to be released. Before the parts are released to make an exposure, the member 46 occupies a position of idleness in substantially the position in which it is seen in Fig. 1. When it is desired to make an exposure, the operator simply turns the button 39 so as to bring the end 56 of said member 46 down against the member 55 of the pawl 30 and push it back sufficiently to release the major swing arm 32, this serving to set all the other parts in motion for making and completing the exposure. It is to be noted that after the parts are set in motion, to make an exposure three things occur in quick succession, first, the major swing arm 32 quickly moves from the position in which it is seen in Fig. 1 to the position in which it is seen in Fig. 4; second, the sector 3, released by this action of the major swing arm 32, moves to the position shown by full lines in Fig. 4, and third, the sector 4, being released by the movement of the first sector, quickly follows the latter so as to take its place.

In order to make exposures of different lengths, the trip arm 47 is shifted so that its pin 57 will occupy the proper one of the holes 8 in the end 6 of the sector 3, the member 47 being rigid with the pivot or pintle 17 at its inner end, and the part 17 being held normally away from the thumb piece 39, in which position the pin 57 of the trip arm 47 occupies some one of the holes 8. Now, when the said pin 57 occupies the first hole, the end 58 of the trip arm 47 is so near the member 54 of the pawl 30 that the sector 4 is quickly released and, quickly following the sector 3, makes an instantaneous exposure. Now should it be desired to make a longer exposure, the member 17 is pressed inward, which carries the trip arm 47 back or inward, withdrawing the pin 57 from the first opening 8 in the head 6 of the sector 3, when, by turning the pintle 17 on its axis, the trip arm may be brought into position to have the pin 57 occupy any one of the other of the holes 8. If the pin occupy the second hole, the end 58 of the trip arm 47 will be correspondingly farther away from the member 54 of the pawl 30 and a longer time will elapse after the sector 3 starts, before the said end 58 will reach the member 54 to release the sector 4. If the pin 57 is moved so as to occupy the third hole from the end, a correspondingly longer time will elapse after sector 3 starts before sector 4 is released, which will give a correspondingly longer exposure; and so on, if the pin is caused to occupy other holes of the series in the end 6 of the sector 3. As the pin is moved from the first hole or opening to the second and so on, the space 15 between the adjacent edges of the sectors will be correspondingly increased, and hence giving an exposure of greater or longer duration. If the pin 57 occupy the last hole in the series, it results in what is known as a time exposure. When the pin is in this position, the end 58 of the trip arm 47 will not reach the member 54 of the pawl 30 at all, the movement of sector 3 being stopped by the pin 37 before the said end 58 reaches the member 54. By this means, the sector 4 is not tripped at all, making the exposure indefinite. In order to terminate this time exposure, sector 4 may be tripped by any ordinary or simple means not herein shown. To reset the parts, preparatory to another exposure, the button 39 is turned in the opposite direction. This brings the end 56 of the swing arm 46 against the pin 11 of sector 3, and a continued turning of the button will turn the sector 3 back to its original position, carrying with it the sector 4 on account of the slight projecting part or lug 14 encountering the inwardly projecting head 10ª of the pin or projection 10 of the sector 3. The two sectors 3 and 4 being thus brought back to their normal positions, the pins 10 and 12 of the parts respectively are caught by the pawls 27 and 30. But, while the sectors 3 and 4 are thus being reset, the circular projection 59 of the arm 46 encounters the edge of the major swing arm 32 and carries the same back to its normal position where it is caught by the tooth or projection 36 of the pawl 30. The pawls or members 27 and 30 are actuated and returned to their normal positions by a slender spring 60, seen clearly in Figs. 1 to 4, which is connected with the member 27 at its lower end, its upper end being held in any suitable manner, as upon a pin 61 or any other suitable means projecting from the wall of the camera. The pawl 27 has projecting therefrom inwardly at one end a short pin or the like 62 in position to encounter the end 63 of the pawl 30, by means of which, when the spring 60 pulls the pawl 27 upward to its normal or locking position, the said pin 62, pressing the end 63 of the pawl 30, will also serve to return the latter to its normal position, locking the pins 12 and 35 of the sector 4 and the major swing arm 32 respectively. There is normally a small space between the end 63 of the pawl 30 and the pin 62 of the pawl 27, and in the operation of the two parts the said part 63 never acts upon the pin 62, but the said pin acts upon the end 63, that is to say, when the swing arm 46 moves the pawl 30 slightly back to release the major swing arm 32, the part or end 63 of the pawl 30 does not press the pin 62 or in any way act to move the pawl 27 to release the pin 10. But, when said two parts 27 and 30 are both thrown back into momentary idleness and the pawl 27 is again quickly drawn to its normal locking position by the spring 60, it causes the pin 62 to press the end 63 of the pawl 30 sufficiently to bring the pawl 30 back to its normal locking position.

The pawls 27 and 30 may be pivotally supported in any suitable manner, as, for instance, as shown in Fig. 5, where said pivots 64 and 28 are shown as mounted in a block 65 made fast to the lower wall of the camera body. It is evident, however, that other provisions may be made for this purpose.

As shown clearly in Figs. 5 and 8, the head 66 of the member 17 has a knurled surface, as seen at 67, to assist the thumb and finger in turning it to set the trip arm 47. This head also has a conical portion 68 which is marked, as shown clearly in Figs. 5 and 8, with a number of equal divisions which may be supplied with suitable reference characters, as 1, 2, 3 T (for time exposure) 1/20, 1/100 and so on, these corresponding to the openings 8 in the head 6 of the sector 3. The thumb piece 39 has a downwardly projecting index or pointer 69, as seen clearly in Fig. 5 which extends over the conical portion of the head of the member 17, as will be clearly understood upon reference to Fig. 5. By turning the head 66 of the member 17 until the member 2, for instance, is brought under the pointer, the trip arm 47 is brought into such position that its pin 57 will engage in the second opening 8 in the end 6 of the sector 3, and so on.

The springs 18 and 22, as well as the springs 60 and 33, are not very powerful as the parts they move are comparatively light. The points of connection of the springs 18 and 22 with their sectors should be sufficiently far away from the axis of motion of the sectors so that either spring shall not be in the way of the head of the other sector. The connections of the ends of the springs may be made in any suitable manner, that shown in Fig. 5 being one efficient way.

The openings in the sector of the arms 46 and 47 respectively are flattened on one side, as seen clearly in Fig. 8, in the arm 47 as a means for holding them from turning on the respective parts 45 and 17.

70 is a spacing washer between the arm 47 and the adjacent wall of the adjacent sector, for an obvious purpose, as seen in Fig. 5.

The top of the camera box is formed with a large rectangular opening 71 closed at intervals by a mirror 72, this opening being for the purpose of viewing the object being photographed before the exposure is made. The mirror 72 is set in a thin metal sheet 73 as a backing, the edges 74 of this sheet on three sides and two little members or clips 75 stamped out of the sheet on the fourth side are turned over to inclose the mirror and hold it. The sheet 73 extends backward beneath a metal strip 76, the two being secured together by rivets or the like 77. The ends of the strip 76 are turned downward, one being elongated to form the slotted arm 78, the strip 76 with the mirror and the thin sheet 73 being held to turn upon the ends of pivot screws 79 inserted through the walls of the camera. The major swing arm 32 is provided with a pin or the like 80 at its upper end extending into a slot 81 in the arm 78 so that when said major swing arm is turned to its position shown in Fig. 1, the mirror 72 will be swung within the camera and to a position at an angle of substantially 45°, so that the image thrown upon it through the lens 2 will be reflected upward through the opening 71 in the camera, normally closed by the mirror, and hence visible to the operator, the major swing arm when in its position seen in Fig. 1 stands at an angle of 45° also with the upper wall of the camera. Before an exposure is made in any given case, the inclined mirror must of course be gotten out of the way of the light passing in through the lens 2, and also must be returned to its normal position, closing the large opening 71 in the top of the camera so as to completely exclude the light at such point. The manner in which this is accomplished will be readily understood. As has already been set forth, the major swing arm 32 is the first element to move when the parts are set in motion to make an exposure, and it will be seen that it swings the mirror so as to completely close the opening, as indicated clearly in Fig. 4, before it trips the pawl 27 to release the sector 3, the mirror thus being out of the way before the exposure commences. The pin 80 carried by the upper end of the major swing arm, reaching the extreme end of the slot 81, forms a stop for the motion of the major swing arm 32 given it by the spring 33.

The projection 13 on the sector 4, adjacent its pin 12 but extending in a direction at right angles thereto, is adapted to encounter an adjacent part of the pawl 30 at the bend thereof from which the members 53 and 54 project, as seen in Fig. 4, forming a stop for the return movement of the sectors 3 and 4, the former being held relatively with the latter by means of the pin 10 and the projecting part 14 of the sector 4. When the major swing arm 32 and the two sectors 3 and 4 are all turned to their stop position, the two pawls 27 and 30 immediately and automatically lock them to place until another exposure is made.

It is thought that from the foregoing description, especially when taken in connection with the annexed drawings, the operation of the parts hereinbefore described will be clearly understood, and that a further detailed description thereof will not be necessary.

Modifications in detail may be resorted to without departing from the spirit of the invention or sacrificing any of its advantages.

It is to be understood that the camera embodies the usual ground glass focusing screen which is disposed outside of the mirror, as indicated by dotted lines in Fig. 2.

What I claim is:—

1. In a camera having a focusing opening in the top, a movably mounted mirror adapted to close said opening, exposure sectors, and means slidably connected with the mirror for controlling the exposure sectors and for moving said mirror to closed position before making an exposure.

2. In a camera having a focusing opening in the top, exposure sectors, a movably mounted mirror adapted to close said opening, and a major swing arm controlling the exposure sectors and slidably connected with the mirror for controlling the movement thereof.

3. In a camera having a focusing opening in the top, exposure sectors, a movably mounted mirror adapted to close said opening, a movably mounted member slidably connected with the mirror, and devices connected with said member and sectors whereby said member first returns the mirror to its closed position and then releases the exposure sectors.

4. In a camera having a focusing opening in the top, a movably mounted mirror normally closing the focusing opening in the top of the camera box, exposure sectors, means for actuating and means for controlling the latter, the mirror and sector controlling means being operatively connected and means slidably connected with the mirror for moving said mirror to its closed position before the exposure commences.

5. In a camera, independently movable sectors, a movable mirror, holding means for said sectors, and a movably mounted member constructed to first return the mirror to its closed position and then release the sectors from the holding means.

6. In a camera, independently movable sectors, a movable mirror, holding means for said sectors, a movably mounted member constructed to first return the mirror to its closed position and then release the sectors from the holding means, and means for varying the length of time between successive movements of the sectors.

7. In a camera, independently movable sectors, a movably mounted mirror, independent holding members for said sectors, and a movably mounted controlling member constructed to first swing the mirror to its closed position and then actuate one of the holding members to actuate and release the sectors.

8. In a camera, independently movable sectors, a movably mounted mirror, independent holding members for said sectors, a movably mounted controlling member constructed to first swing the mirror to its closed position and then actuate one of the holding members to actuate and release the sectors, and means for varying the length of time between the successive movements of the sectors.

9. In a camera, independently movable sectors, a major swing arm, and connections for controlling said sectors, and a movably mounted mirror with a sliding connection between the latter and the major swing arm.

10. In a camera, independently movable sectors mounted on a common axis, holding means for said sectors, a spring acting upon each sector to move it when released, movably mounted releasing mechanism for the sectors embodying a major member, and a movably mounted mirror having loose connection with said major member.

11. In a camera, independently movable sectors, springs acting thereon to move them on their pivots when released, means for controlling the release of the sectors, and a movably mounted mirror controlled by one member of said controlling means, another member of the controlling means having adjustable connection with one of the sectors to vary the time of exposure.

12. In a camera, a camera box having an opening in its top, a movably mounted mirror fitted light-tight to said opening, exposure sectors and means controlling the exposure sectors for moving said mirror into an angular position and returning the same to its closed position before making the exposure.

13. In a camera, independently movable sectors, springs acting thereon to move them on their pivots when released, means for controlling the release and movement of the sectors, and a movably mounted mirror controlled by said releasing means.

14. In a camera, independently movable sectors, a pivotally mounted arm, a pivotally mounted mirror frame operatively connected with said arm, a mirror detachably secured in said frame, and a holding member for said sectors controlled by said arm.

15. In a camera, independently movable sectors, a pivotally mounted arm, a movably mounted mirror support operatively connected with said arm, a backing for said mirror carried by said support, means for clamping said mirror to said backing, and operative connections between said sectors and arm.

16. In a camera, a movably mounted frame having a slotted arm, a mirror mounted in said frame, and an exposure controlling member having one end slidably engaged with the slotted arm.

In witness whereof, I have hereunto set my hand this 3rd day of October, 1908, in the presence of two subscribing witnesses.

OLIVER W. PLANT.

Witnesses:
E. B. WHITMORE,
A. M. WHITMORE.